United States Patent
Radhakrishnan et al.

(10) Patent No.: US 12,111,858 B1
(45) Date of Patent: Oct. 8, 2024

(54) DATABASE SYSTEM INTERACTION EMBEDDING AND INDEXING FOR TEXT RETRIEVAL AND GENERATION

(71) Applicant: Salesforce, Inc., San Francisco, CA (US)

(72) Inventors: Regunathan Radhakrishnan, Dublin, CA (US); Zachary Alexander, Berkeley, CA (US); Yuanxin Wang, Mountain View, CA (US); Sitaram Asur, Fremont, CA (US); Aron Kale, Huntington Beach, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/481,036

(22) Filed: Oct. 4, 2023

(51) Int. Cl.
 *G06F 16/33* (2019.01)
 *G06F 16/31* (2019.01)
 *G06N 3/0455* (2023.01)

(52) U.S. Cl.
 CPC .......... *G06F 16/3347* (2019.01); *G06F 16/31* (2019.01); *G06N 3/0455* (2023.01)

(58) Field of Classification Search
 CPC .... G06F 16/3347; G06F 16/31; G06N 3/0455
 USPC ........................................................ 707/741
 See application file for complete search history.

(56) References Cited

U.S. PATENT DOCUMENTS

| | | | |
|---|---|---|---|
| 10,565,265 B2 | 2/2020 | Alexander et al. | |
| 10,803,127 B2 | 10/2020 | Alexander et al. | |
| 10,997,250 B2 | 5/2021 | Asur et al. | |
| 11,061,954 B2 | 7/2021 | Alexander et al. | |
| 11,061,955 B2 | 7/2021 | Alexander et al. | |
| 11,086,471 B2 | 8/2021 | Pascale et al. | |
| 11,294,891 B2 * | 4/2022 | Aggarwal | G06F 16/90332 |
| 11,327,979 B2 | 5/2022 | Govindarajan et al. | |
| 11,379,671 B2 | 7/2022 | Alexander et al. | |
| 11,544,762 B2 | 1/2023 | Mao et al. | |
| 11,580,179 B2 | 2/2023 | Xiu et al. | |
| 11,651,237 B2 | 5/2023 | Rickard, Jr. et al. | |

(Continued)

OTHER PUBLICATIONS

Qu, Chen, et al., "Attentive History Selection for Conversational Question Answering", CIKM '19, Beijing, China, Nov. 3-7, 2019, pp. 1391-1400.*

(Continued)

*Primary Examiner* — Robert Stevens
(74) *Attorney, Agent, or Firm* — Polygon IP, LLP

(57) ABSTRACT

A text interaction record including interaction text from one or more messages between a client machine and a service provider is received at a database system. A search vector including a text embedding representing the interaction text in a multi-dimensional vector space may be determined based on the interaction text via a processor at the database system. A reference interaction record including reference interaction text may be retrieved from the database system based on the search vector. The reference interaction record may include a reference vector representing the reference interaction text in the multi-dimensional vector space. Recommended reply text is determined based on the interaction text and the reference interaction text by a large language model configured to generate the recommended reply text in response to a prompt that includes one or more natural language instructions.

20 Claims, 8 Drawing Sheets

(56) References Cited

U.S. PATENT DOCUMENTS

| | | | |
|---|---|---|---|
| 11,755,655 B2 | 9/2023 | Asur et al. | |
| 11,907,673 B1* | 2/2024 | Hao | G06F 16/35 |
| 11,971,914 B1* | 4/2024 | Watson | G06F 16/3347 |
| 2014/0108389 A1* | 4/2014 | Lee | G06F 16/3347 |
| | | | 707/765 |
| 2018/0089585 A1 | 3/2018 | Rickard, Jr. et al. | |
| 2020/0097544 A1 | 3/2020 | Alexander et al. | |
| 2020/0097809 A1 | 3/2020 | Velasco et al. | |
| 2021/0097140 A1* | 4/2021 | Chatterjee | G06N 5/022 |
| 2021/0149921 A1 | 5/2021 | Alexander et al. | |
| 2021/0149949 A1 | 5/2021 | Alexander et al. | |
| 2021/0149964 A1 | 5/2021 | Wang et al. | |
| 2021/0150144 A1 | 5/2021 | Kale et al. | |
| 2021/0256534 A1* | 8/2021 | An | G06N 3/08 |
| 2022/0138211 A1* | 5/2022 | Venkataraman | H04N 21/4828 |
| | | | 707/728 |
| 2022/0277142 A1* | 9/2022 | Mohan | G06F 16/3329 |
| 2022/0293094 A1 | 9/2022 | Mao et al. | |
| 2022/0318501 A1 | 10/2022 | Alexander | |
| 2022/0318669 A1 | 10/2022 | Alexander et al. | |
| 2023/0089596 A1 | 3/2023 | Huffman et al. | |
| 2023/0090924 A1 | 3/2023 | Mao et al. | |
| 2023/0092702 A1 | 3/2023 | Mao et al. | |
| 2023/0112369 A1* | 4/2023 | Chopra | G06F 40/279 |
| | | | 705/304 |
| 2023/0118341 A1 | 4/2023 | Erramilli et al. | |
| 2023/0229763 A1 | 7/2023 | Radhakrishnan et al. | |
| 2023/0244766 A1 | 8/2023 | Erramilli et al. | |
| 2023/0252314 A1 | 8/2023 | Rickard, Jr. et al. | |

OTHER PUBLICATIONS

Frieder, Ophir, et al., "Caching Historical Embeddings in Conversational Search", ACM Trans. Web, vol. 1, No. 1, Nov. 2022, 19 pages.*

Kushwaha, Amit Kumar, et al., "MarkBot—A Language Model-Driven Chatbot for Interactive Marketing in Post-Modern World", Information Systems Frontiers, vol. 26, Aug. 30, 2021, pp. 857-874.*

* cited by examiner

Database System 200

Communication Interface 202

Conversation Indexer 204

Database Query Engine 206

Interaction Database Table 208

Interaction Record 250

| Index 252 | Interaction Topic 254 | Text Embedding 256 | Interaction Text 258 |

Interaction Metadata 259

. . .

Interaction Record 260

| Index 262 | Interaction Topic 264 | Text Embedding 266 | Interaction Text 268 |

Interaction Metadata 269

Large Language Model Interface 210

Figure 2

DATABASE SYSTEM INTERACTION EMBEDDING AND INDEXING FOR TEXT RETRIEVAL AND GENERATION

FIELD OF TECHNOLOGY

This patent application relates generally to database systems, and more specifically to techniques for identifying and accessing text-based database records.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks. One example of such a cloud computing service is a database system that stores data for a variety of users and is accessible via the internet.

Database systems store increasingly store large amounts of text-related information. For instance, a database storing customer relations management (CRM) information may store many records reflecting interactions between customer service agents and customers. Such information is useful, for instance as examples when generating novel text in the course of new customer interactions. However, existing search and retrieval techniques for text information stored in database systems are limited. Accordingly, conventional techniques for searching and retrieving text information often return data records of limited relevance and hence limited utility. Accordingly, improved techniques for database system text record search and querying are desired.

BRIEF DESCRIPTION OF THE DRAWINGS

The included drawings are for illustrative purposes and serve only to provide examples of possible structures and operations for the disclosed inventive systems, apparatus, methods, and computer program products for text generation based on database records. These drawings in no way limit any changes in form and detail that may be made by one skilled in the art without departing from the spirit and scope of the disclosed implementations.

FIG. 2 illustrates a database system, configured in accordance with one or more embodiments.

DETAILED DESCRIPTION

Figure 1:
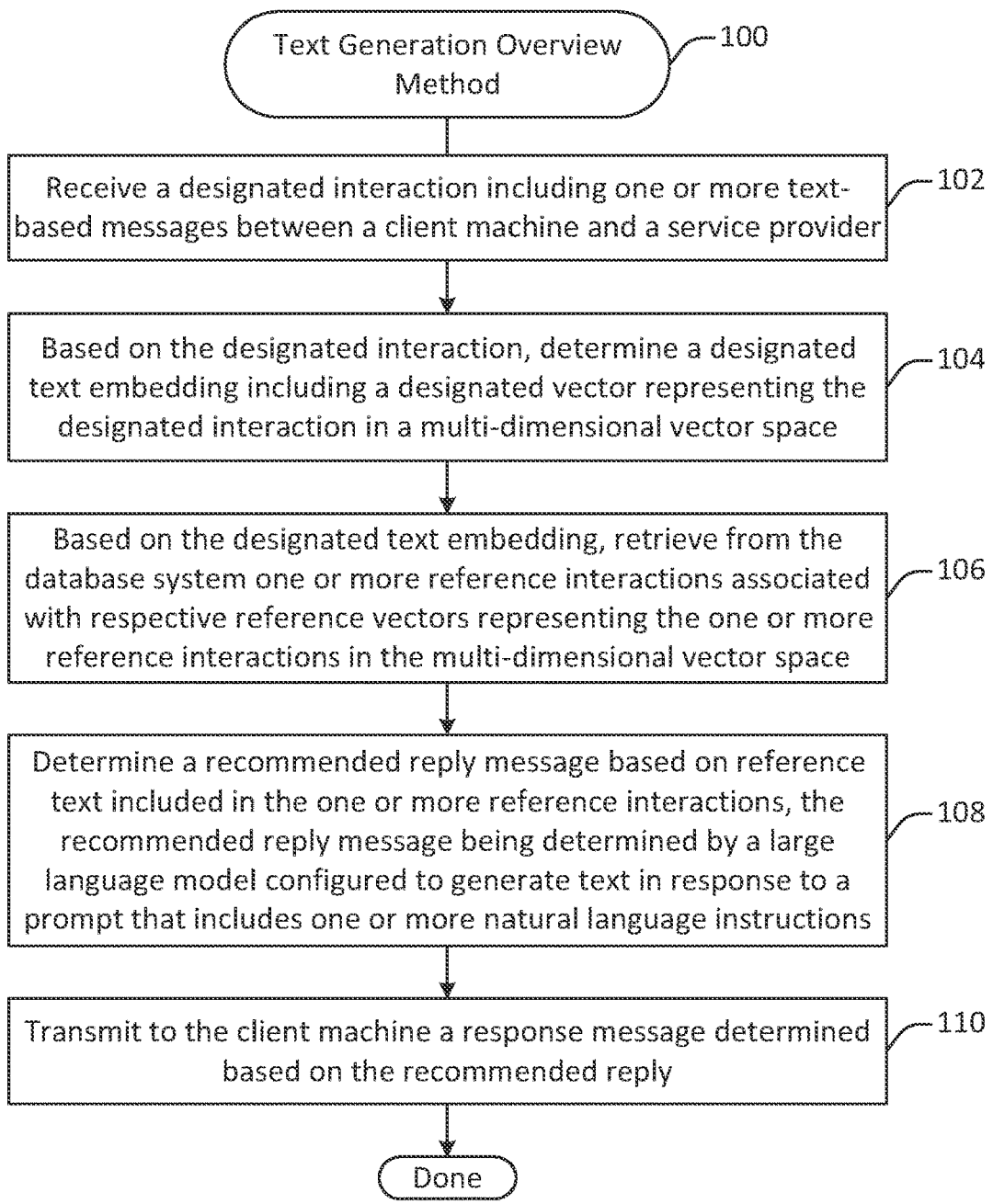
FIG. 1 illustrates an overview method for generating text, performed in accordance with one or more embodiments.

Techniques and mechanisms described herein provide for generating text to assist human agents corresponding with individuals at remote computing systems. For example, text may be generated to assist a customer service agent in a live chat with a customer. To generate appropriate text, past conversations similar to the current conversation may be retrieved. The past conversations may then be provided as input to a generative language model. The output of the generative language model may be provided as recommended text. Although the human agent may edit the recommended text prior to transmission, automatically generating the recommended text may provide significant productivity gains.

Text retrieval presents a significant technical challenge due to the unstructured nature of information stored as text. Text generation in the context of a live chat interaction presents additional technical challenges. First, a live chat interaction evolves over time, so text that is relevant earlier in the interaction may be different than text that is relevant later in the interaction. For example, the subject and tone of the interaction may change considerably as time progresses. Second, the live nature of the interaction means that text retrieval needs to be fast in order to be useful. Accordingly, improved techniques for rapidly identifying and accessing text based on relevance to other text help to address several significant technical challenges in information retrieval and novel text generation.

Consider the example of Alex, a customer service agent tasked with interacting with customers via a live chat interface. When using conventional techniques, Alex would need to separately type each text interaction with a customer. Although some text recommendation systems exist, recommendations are typically limited to predicting a few words based on a partial sentence manually entered by a user. Conventional techniques for recommending entire sentences or utterances typically fail to capture the nuance of the interaction and yield text that is perceived as artificial and inappropriate to the context.

In contrast to these conventional techniques, suppose instead that Alex were employing a text retrieval and generation system provided in accordance with one or more embodiments described herein. In such a system, the utterances in the interaction between Alex and the customer may be used to find similar interactions in the past, which may then be used to provide input to a large language model for generating relevant recommended text. Alex may send the recommended text as-is or may choose to edit the recommended text prior to sending. In either case, Alex may engage in higher-quality interactions with substantially less manual text generation than when using conventional techniques.

According to various embodiments, text records representing conversations and being stored in a database system may be pre-processed to identify two or more information components. First, a text record may be preprocessed to identify a conversation topic for the conversation reflected in the text record. Second, a text record may be preprocessed to determine a text embedding of the conversation reflected in the text record based on sequential utterances. The text records may then be treated as values and indexed using at least these two components as keys. For instance, the components may be concatenated to produce the keys. As part of the preprocessing operations, a complete conversation may potentially be indexed multiple times, for instance by dividing it into partial sections of the whole conversation.

According to various embodiments, the pre-processed text records may be included in an online (i.e., live) text retrieval and reply recommendation process. For example, in a new conversation between a human agent and a remote individual, the utterances up to a point in time may be processed to extract a conversation topic and a text embedding of the conversation. The conversation topic and text embedding may then be used to search the text records stored in the database system using the keys associated with the stored text records. The search may be further filtered based on additional characteristics, such as similarity of business unit or product, recency of the retrieved records, performance information for the stored records, identity of participants associated with generating the stored records, and the like. Next, the database system may determine a prompt to a large language model that takes into consideration both the current conversation and one or more retrieved conversations. When the large language model completes the prompt, the generated text may be provided as recommended replies for the agent to use as the conversation continues.

According to various embodiments, techniques and mechanisms described herein may be used to ground recommended response generation in past conversations. Such grounding can help capture procedures that agents employ in response to particular issues without needing to manually encode such procedures in a text generation model. Such grounding can also help to capture implicit aspects of interactions, such as how human agents from a particular organization interact with individuals. These implicit aspects of interactions between human agents and individuals would be difficult, if not impossible, to manually encode into text generation models and processes.

According to various embodiments, the term "text interaction" as used herein refers to any type of communication that can be treated as or converted to text. Such communications may include, but are not limited to: communications conducted via a live chat interface, a social media system, one or more emails, voice conversation, other types of communication, or a combination thereof. A text interaction is also referred to herein as a conversation.

FIG. 1 illustrates an overview method 100 for generating text, performed in accordance with one or more embodiments. The method 100 may be performed at a database system such as the database system 200 shown in FIG. 2.

A designated interaction including one or more text-based messages between a client machine and a service provider is received at a database system at 102. In some embodiments, the designated interaction may be a conversation that takes place in the context of a live chat interaction. For instance, a customer service agent may interact with a customer at the client machine via a chat interface that includes a protocol for transmitting live chat messages via a network.

Based on the designated interaction, at 104 a designated text embedding including a designated vector representing the designated interaction in a multi-dimensional vector space is determined. In some embodiments, the designated text embedding may be determined by a conversation embedding process. The conversation embedding process may extract information from conversation in a way that captures a sequence of back-and-forth utterances between two individuals.

In some embodiments, in addition to the designated text embedding, one or more conversation topics may be identified. A conversation topic may include an overall subject, motivation, or purpose of the conversation or part of the conversation. In some configurations, the conversation topic may be encoded as a value, such as the identity of a cluster determined by performing clustering analysis on reference interactions stored in the database system. Alternatively, or additionally, the conversation topic may be encoded as a vector into a vector space representing topics.

Based at least in part on the designated text embedding, at 106 one or more reference interactions associated with respective reference vectors representing the one or more reference interactions in the multi-dimensional vector space are retrieved from the database system. According to various embodiments, the reference interactions may be pre-processed to determine the respective reference vectors. Additional details regarding operations for pre-processing the reference interactions are discussed with respect to the method 300 shown in FIG. 3. Additional details regarding the retrieval of the reference interactions based on the designated text embedding are discussed with respect to the method 400 shown in FIG. 4.

A recommended reply message is determined at 108 based on reference text included in the one or more reference interactions. The recommended reply message may be determined by a large language model configured to generate text in response to a prompt that includes one or more natural language instructions.

A response message determined based on the recommended reply message is sent to the client machine at 110. In some embodiments, the response message may include the recommended reply message in its entirety. Alternatively, the recommended reply message may be edited to add, remove, or alter text, for instance by a human agent. In such a situation, the response message may nevertheless include a portion of the recommended reply message. Additional details regarding the determination of the recommended reply message and the determination and transmission of the response message are discussed with respect to the method 500 shown in FIG. 5.

FIG. 2 illustrates a database system 200, configured in accordance with one or more embodiments. The database system 200 may perform one or more methods described herein, such as the methods shown in FIG. 1, FIG. 3, FIG. 4, and FIG. 5. The database system 200 may be implemented in conjunction with one or more of the devices, components, and systems shown in FIG. 6, FIG. 7A, FIG. 7B, and FIG. 8.

The database system 200 includes a communication interface 202, a conversation indexer 204, a database query engine 206, an interaction database table 208, and a large language model interface 210. The interaction database table 208 includes one or more interaction database records such as the interaction database records 250 through 260. The interaction database record 250 includes an index 252, which includes an interaction topic 254 and a text embedding 256, and interaction text 258. Similarly, the interaction database record 260 includes an index 262, which includes an interaction topic 264 and a text embedding 266, and interaction text 268. Optionally, an interaction database record may include interaction metadata such as the metadata 259 and 269.

According to various embodiments, the communication interface 202 may be configured to communicate with other elements of an on-demand computing services environment in which the database system is situated. For instance, the communication interface 202 may be configured to communicate with an application server configured to support communications between a remote computing device and a service provider such as system operated by a human agent. Accordingly, the communication interface 202 may receive from the application server text information generated in the course of conducted such communications and transmit to the application server recommended text for use in such communications. Additional details regarding the generation of such text are discussed with respect to the method 400 shown in FIG. 4.

According to various embodiments, the conversation indexer 204 may be configured to receive text generated in the course of a communication session and then determine one or more indexes for that text. An index may be used to store the received text in the interaction database table 208. Alternatively, or additionally, the index may be used to retrieve similar text from the interaction database table 208. The interaction database table 208 may be accessed for data storage and/or retrieval via the database query engine 206.

In some implementations, the interaction database table 208 may be used to store one or more records for previous interactions. The interaction text 258 may store the text of a previous interaction, while the interaction index 252 may be used to search for and retrieve interactions based on a search query.

In some embodiments, an interaction index may include one or more elements. For instance, the interaction index 252 includes the interaction topic 254 that characterizes the interaction as a whole. The interaction index 252 also includes the text embedding 256 which provides more detailed and granular information about the sequence of utterances between the parties to the conversation.

In some embodiments, an interaction record may include metadata, such as the interaction metadata 259. The metadata 259 may allow the database query engine 206 to search the interaction records based on additional characteristics, such as the identity of the interaction participants, a date and/or time that the interaction occurred, performance evaluation information for the interaction, and/or other types of information.

In some implementations, the large language model interface 210 may be used to generate text based at least in part on information retrieved via the database query engine 206. For instance, interaction text associated with interaction records retrieved via the database query engine 206 may be provided to a large language model via the large language model interface 210 and used by the large language model interface 210 to generate novel text, such as a recommended reply to be used in an ongoing interaction.

In some embodiments, a large language model accessible via the large language model interface 210 may be located within the on-demand computing services environment in which the database system is located. Alternatively, a large language model accessible via the large language model interface 210 may be located remotely.

According to various embodiments, any of various large language models may be used. For instance, the large language model may be the ChatGPT model available from OpenAI, Google's Bard system, or any other suitable generative language model.

Figure 3:
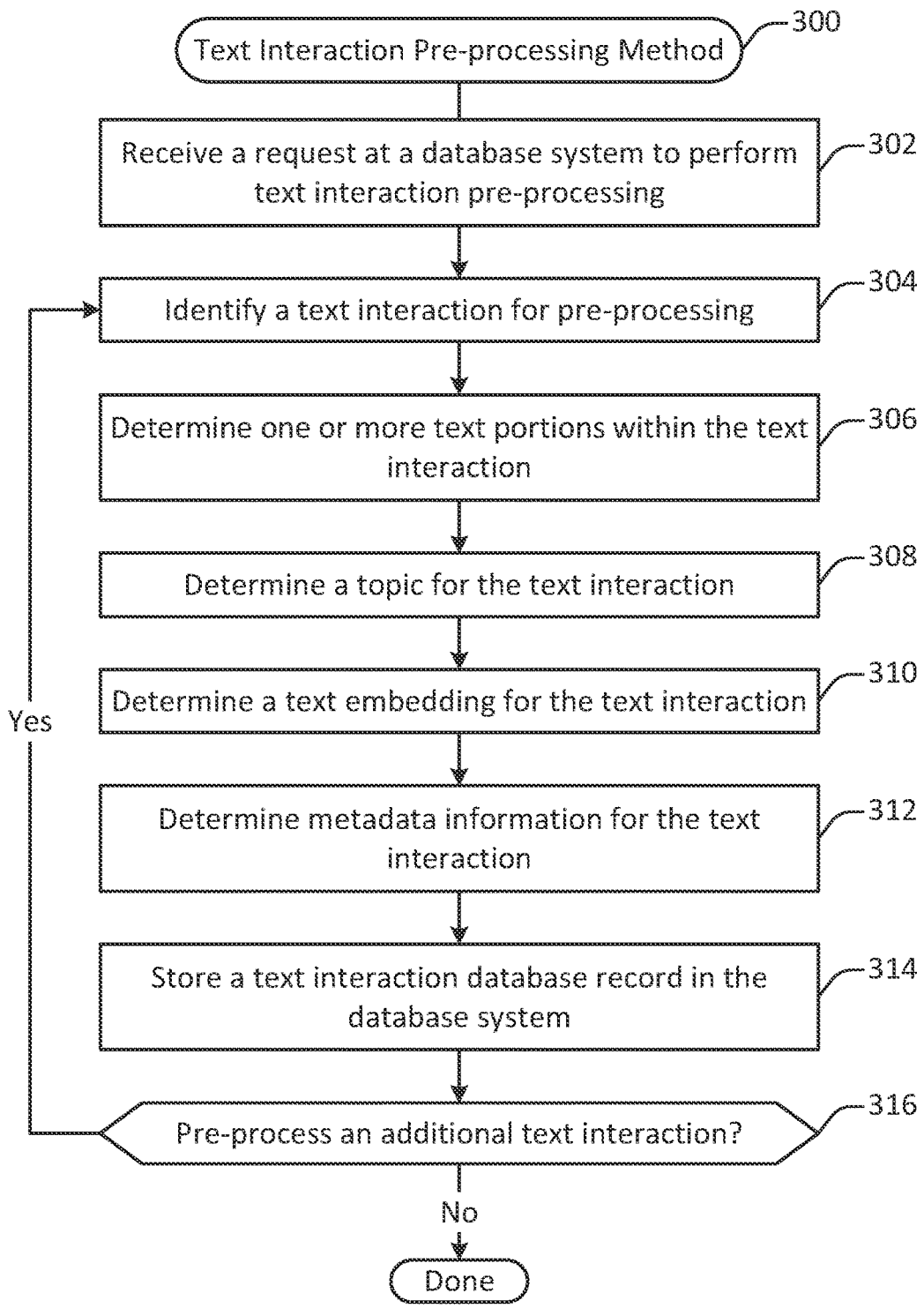
FIG. 3 illustrates a method for pre-processing text interactions, performed in accordance with one or more embodiments.

FIG. 3 illustrates a method 300 for pre-processing text interactions, performed in accordance with one or more embodiments. The method 300 may be performed at the database system 200 shown in FIG. 2. The method 300 may be performed in order to store one or more text interactions in the database system 200 for later search and retrieval, for instance for the purpose of generating novel text for recommending a reply in a new interaction.

A request to perform text interaction pre-processing is received at a database system at 302. According to various embodiments, the request may be generated at any of various times. For example, the request may be generated when a new interaction is received by the database system, for instance immediately after it is conducted. As another example, the request may be generated periodically or at otherwise scheduled times. For instance, batches of interactions may be processed periodically, such as once per day.

A text interaction for pre-processing is identified at 304. The text interaction may be identified at the conversation indexer 204 shown in FIG. 2. According to various embodiments, the text interaction may characterize any type of communication between two or more parties. For example, the text interaction may reflect a conversation conducted via a live chat interface. As another example, the text interaction may reflect two or more emails, text messages, or social media messages sent via a text messaging interface. As yet another example, the text interaction may reflect a voice conversation converted to text via a voice-to-text processing system.

In some embodiments, the conversation indexer 204 may divide a single text interaction into two or more text interactions. For example, the system may impose a maximum length on a text interaction. As another example, the system may analyze a text interaction and determine that, for instance, the first part of the interaction relates to a first topic and a second part of the interaction relates to a second, different topic.

One or more text portions within the text are identified at 306. In some embodiments, dividing the text into portions may facilitate sequential analysis of the text. For instance, a text portion may be identified as a single utterance by an individual. An utterance may be one or more messages by the individual that are uninterrupted by text from other individuals. Thus, the text may be divided into a sequence of text portions corresponding with respective utterances by the individuals participating in the conversation.

A topic for the text interaction is determined at 308. According to various embodiments, the types of topics determined may depend in significant part on the types of conversations being analyzed. For example, the topic may identify a particular type of problem with a particular type of device purchased by a customer. As another example, the topic may identify a question about an aspect of a service arrangement. As another example, the topic may identify a request to return a particular type of device. As still another example, the topic may identify a request for technical assistance in a particular context.

In some embodiments, topic granularity may present a tradeoff. An increase in topic granularity may provide for more accurate conversation retrieval at the expense of having relatively fewer conversations for any particular topic.

According to various embodiments, topics may be determined in any of various ways. For example, the topic may be determined by applying an unsupervised clustering model to the text interaction to identify a single topic, which may be encoded as any distinct value capable of being stored in the database system. As another example, the topic may be determined by applying a word embedding model to represent the topic as a vector in a multi-dimensional vector space. As yet another example, the topic may be determined by applying an unsupervised topic model to identify one or more topics for the text interaction.

In some implementations, the topic may be identified via a large language model. For instance, a prompt including the interaction text and one or more natural instructions to identify the topic may be provided to a large language model. The large language model may then complete the prompt to provide the interaction topic. An example of a prompt template used to generate such a prompt is as follows. In the following prompt, "{conversation_context}" indicates a fillable portion that may be filled with some or all of the text from the conversation.

> Identify the contact reason of the customer from the CONVERSATION section below. The CONVERSATION section contains an ongoing conversation between a customer and a service agent with multiple turns.
> ###
> CONVERSATION:
> {conversation_context}
> ###
> Desired format:
> {{
> "contact_reason":<identified contact reason from conversation above>
> }}
> What is the contact reason for the customer? If the contact reason is not yet mentioned, then say "none"
> Response JSON:

A text embedding is determined for the text interaction at 310. In some embodiments, the text embedding may be determined by applying a conversation embedder to the interaction text. The conversation embedder may determine a vector that represents the conversation text in a multi-dimensional vector space. In this way, the text interaction may be retrieved by searching for text interactions associated with a text embedding represented by a vector located in a similar area of the multi-dimensional vector space as a search vector.

In some embodiments, a conversation may include a sequence of utterances by different individuals. For instance, one or more sentences by a customer may be treated as a first utterance. Then, one or more sentences by a human agent provided in response may be treated as a second utterance. In such a configuration, the text included in an utterance may be generated by a single participant in a conversation.

In some embodiments, a conversation may be divided into sequential portions, with the text embedding being determined separately for different sequential portions. For example, the utterances in a conversation may be indexed sequentially. Then, the separate text embeddings may be determined for different portions.

In some embodiments, different text embeddings may be determined for the first five utterances, the first ten utterances, the first fifteen utterances, and so on. Alternatively, or additionally, different text embeddings may be determined for sequential intervals (e.g., 0-5, 5-10, 10-5) of utterances. In particular embodiments, a window may be applied so that a text embedding is limited to no more than a particular number (e.g., 20) of utterances. For instance, a text embedding may be determined for utterances 5-25. By dividing a conversation into sets of utterances, the conversation may be retrieved based on similarity of a first portion to search query for some first portion of the utterance.

In some embodiments, a text embedding configured for use in embedding a conversation may include various elements. For example, an utterance encoder $F_u$ may be used to map a single utterance to an embedding vector. The utterance encoder may be initialized with a bidirectional encoder representations from transforms (BERT) model. As another example, a document encoder $F_d$ may be used to map a knowledge article to an embedding vector. The document encoder may also be initialized with a BERT model. As yet another example, an utterance importance function $F_a$ may be used to map a single utterance embedding to an importance score. The utterance importance function may be implemented as a multilayer perceptron network, for instance with a single hidden layer of dimension 4*d, where d defines the dimensionality of the embedding vector. As still another example, a conversation embedding Fc may be used to map a full or partial conversation to a fixed-length vector. The conversation embedding may exhibit a functional form such as that shown in the following equation.

$$F_a(C) := \Sigma_{u \in C} \alpha_u Fu(u) \text{ where } \alpha_u \propto F_a(F_u(u)) \text{ and}$$
$$\Sigma_{u \in C} \alpha_u = 1$$

The conversation embedding may not necessarily include any trainable parameters separate from the utterance importance function and the utterance encoder. The score of a conversation/article pair may be defined based on the following equation.

$$s(C, A) = \langle F_c(C), F_d(A) \rangle = \left\langle \sum_{u \in C} \alpha_u F_u(u), F_d(A) \right\rangle = \sum_{u \in C} \alpha_u \langle F_u(u), F_d(A) \rangle$$

According to various embodiments, the conversation embedding described in the previous paragraph may be implemented as a network including attention and pre-trained sentence transformer models. The network may be initially fine-tuned, for instance to maximize retrieval scores for retrieving past conversations or knowledge articles related to example conversations in the training set. Then, when a new conversation context is received with different utterances in turn for a human agent and an individual at a remote computing device, a new conversation embedding may be obtained as follows. First, utterances may be separately embedded using a sentence embedder model (e.g., $F_u$). Second, utterance attention scores may be determined for the utterances using a feed forward network (e.g., $F_a$). Third, conversational context embeddings may be determined as the weighted (by attention) average of the individual utterance embeddings.

Metadata information for the text interaction is determined at 312. In some embodiments, some or all of the metadata information may be provided by an application server responsible for facilitating the interaction. Alternatively, or additionally, some or all of the metadata may be determined based on analyzing the interaction text.

According to various embodiments, the metadata information may include any or all of a variety of types of information about the interaction. For example, metadata may identify one or more parties to the interaction. For instance, metadata may identify a customer, device, account, and/or human agent participating in the interaction. As another example, metadata information may include date and/or time information characterizing when the interaction occurred. As another example, metadata information may include performance data characterizing an evaluation of the interaction. The performance data may include, for instance, an indication as to whether the interaction was successful, an indication as to a customer review of the interaction, an indication as to whether a problem was successfully resolved, or the like. As still another example, metadata information may identify a tone associated with the conversation reflected by the interaction.

A text interaction database record is stored in the database system at 314. In some embodiments, the text interaction database record may include some or all of the information determined in the method 300. For instance, as shown in FIG. 2, a text interaction database record may include an index, interaction text, and optionally interaction metadata. The text interaction database record may be stored in the database by a database query engine.

In some embodiments, the text interaction database record may include an index determined based on the topic and/or the text embedding. For instance, the topic may be concatenated with the text embedding to determine the index. In this way, the text interaction database record may be retrievable via a search employing a search vector that includes a search topic and a search text embedding.

A determination is made at 316 as to whether to preprocess an additional text interaction. According to various embodiments, text interactions may be processed in parallel or in sequence, and in any suitable order. Furthermore, one or more operations shown in FIG. 3 may be performed in a different order than that shown. For instance, multiple text interaction database records may be stored to the database in a single query rather than separately.

Figure 4:
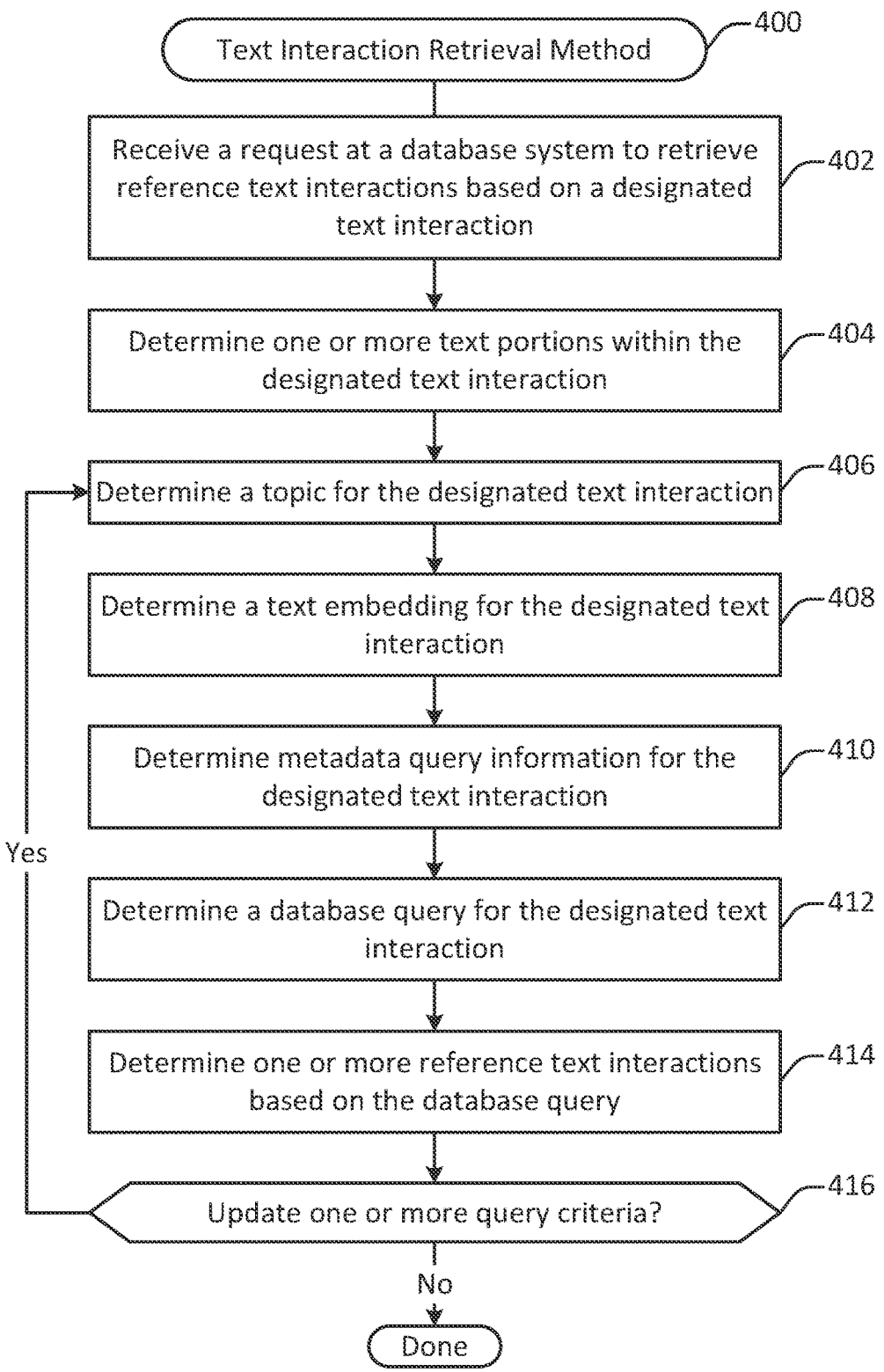
FIG. 4 illustrates a method for retrieving one or more text interactions, performed in accordance with one or more embodiments.

FIG. 4 illustrates a method 400 for retrieving one or more text interactions, performed in accordance with one or more embodiments. The method 400 may be performed at a database system such as the database system 200 shown in FIG. 2.

At 402, a request is received at the database system to retrieve one or more reference text interactions based on a designated text interaction. According to various embodiments, the designated text interaction may be any communication that has been converted to text, and may represent communication between two or more entities. For instance, the designated text interaction may be a record of a live chat interaction, a voice call converted to text, a sequence of text messages or emails, or any other suitable representation of a conversation.

In some embodiments, the designated text interaction may be conducted via the database system itself. For instance, the designated text interaction may reflect a conversation between a customer service agent and a customer via a live chat interface provided via the database system. Alternatively, the designated text interaction may reflet a conversation conducted outside the database system. In such a configuration, the database system may be accessed via an interface for the purpose of storing text interactions and then generating recommended text based on the stored text interactions.

A topic is determined for the designated text interaction at 406, and a text embedding for the designated text interaction is determined at 408. In some embodiments, the topic and the text embedding may be determined in a manner similar to that discussed with respect to operations 308 and 310 shown in FIG. 3.

Metadata query information is optionally determined for the designated text interaction at 410. According to various embodiments, the metadata query information may include one or more of various types of criteria that may be used to refine the search for reference text interactions. A non-exhaustive list of examples of such criteria is provided below.

In some embodiments, metadata may be used to identify reference text interactions that have occurred within some window of time. For example, a metadata criterion may be used to retrieve reference text interactions for conversations that occurred within a particular time window, such as the most recent two-week period. As another example, reference text interactions may be used to prioritize more recent interactions over less recent interactions, for instance if the search returns different interactions of similar relevance but dating from different time periods. By prioritizing or selecting based on text record timing, records may be selected that are more likely to be relevant, for instance in the event that the text interactions reflect conversations related to a recently released product.

In some embodiments, metadata may be used to identify conversations within a target business unit and/or related to a target product or service. For instance, the designated text interaction may be associated with metadata characterizing a target business unit, product, or service to which the text interaction relates. Alternatively, or additionally, the interaction text in the text interaction may be analyzed to identify such a target business unit, product, or service. Such information may then be used to identify reference text interactions. Such search criteria may be used in any of a variety of situations, for instance when identifying reference conversations related to technical support of a product or service.

In some embodiments, metadata may be used to identify conversations with a particular participant or participants. For example, metadata may be used to prioritize the retrieval of conversations with the same customer and/or the same human agent as the designated conversation. As another example, metadata may be used to select or prioritize reference conversations involving human agents rated as highly skilled and/or highly performing. Such criteria may be used for a variety of purposes, such as ensuring that past interactions with the customer are reflected in recommended text, generating recommended text consistent with the human agent's personal communication style, and/or generating recommended text consistent with interactions considered of high quality by a service provider.

In some embodiments, default metadata information may be used. Alternatively, or additionally, one or more metadata criteria may be dynamically determined, for instance base on user input. In particular embodiments, as discussed with operation 416 below, metadata criteria may be iteratively refined to identify more relevant text interactions.

A database query is determined for the designated text interaction at 412. In some embodiments, the database query may include an index determined based on the topic and the text embedding, for instance by concatenating the topic with the text embedding. Additionally, the database query may optionally include one or more metadata query criteria determined as discussed with respect to the operation 410.

In some embodiments, the database query may treat a topic and text embedding portion separately. In this way, a database query may separately search and filter based on topic and (e.g., via a discrete requirement that the topic match) and text embedding (e.g., via a top k match criterion). Alternatively, a topic and/or text embedding may be separately weighted in a query, for instance if both facilitate searching based on relatively continuous similarity values.

In some embodiments, a query and/or text embedding may be weighted based on any of various criteria. For example, the system may weight or rank embeddings based on recency of terms, the presence of key terms (e.g. product names), or any other characteristics.

One or more reference text interactions are determined at 414 based on the database query. In some embodiments, the one or more reference text interactions may be determined by executing the database query against the interaction database table 208 using the database query engine 206 shown in FIG. 2.

In some implementations, executing the database query may involve identifying reference interaction database records having an index similar to the index determined for the database query. For instance, retrieved reference interactions having the same topic as included in the database query and a text embedding vector similar to that included in the database query may be identified. Similarity may be determined based on a distance measure computed in the multidimensional space. Examples of such distance metrics may include, but are not limited to: cosine distance, Euclidean distance, Minkowski distance, dot product distance, or any other suitable distance metric.

In some embodiments, the reference text interactions retrieved by the system may be selected and/or filtered. For instance, the system may select the top k text interactions in order of relevance for some value of k. The number of reference text interactions retrieved may be determined based on a configuration parameter. Alternatively, or additionally, the number of reference text interactions retrieved may be dynamically determined. For instance, a large language model may impose a word limit for prompts submitted to the large language model. This word limit may then restrict the number of reference text interactions that may be included in the prompt.

A determination is made at 416 as to whether to update one or more query criteria. In some embodiments, the determination may be made based on criteria such as a number and relevance of reference interactions retrieved by the database query. For instance, if a large number of database records are retrieved, then more restrictive metadata criteria may be used to further refine the quality and/or relevance of the text interactions retrieved. If instead a small number of database records are retrieved, and/or if the retrieved reference text interactions are below a designated relevance threshold, then one or more metadata criteria may be relaxed so as to retrieve additional relevant records.

Figure 5:
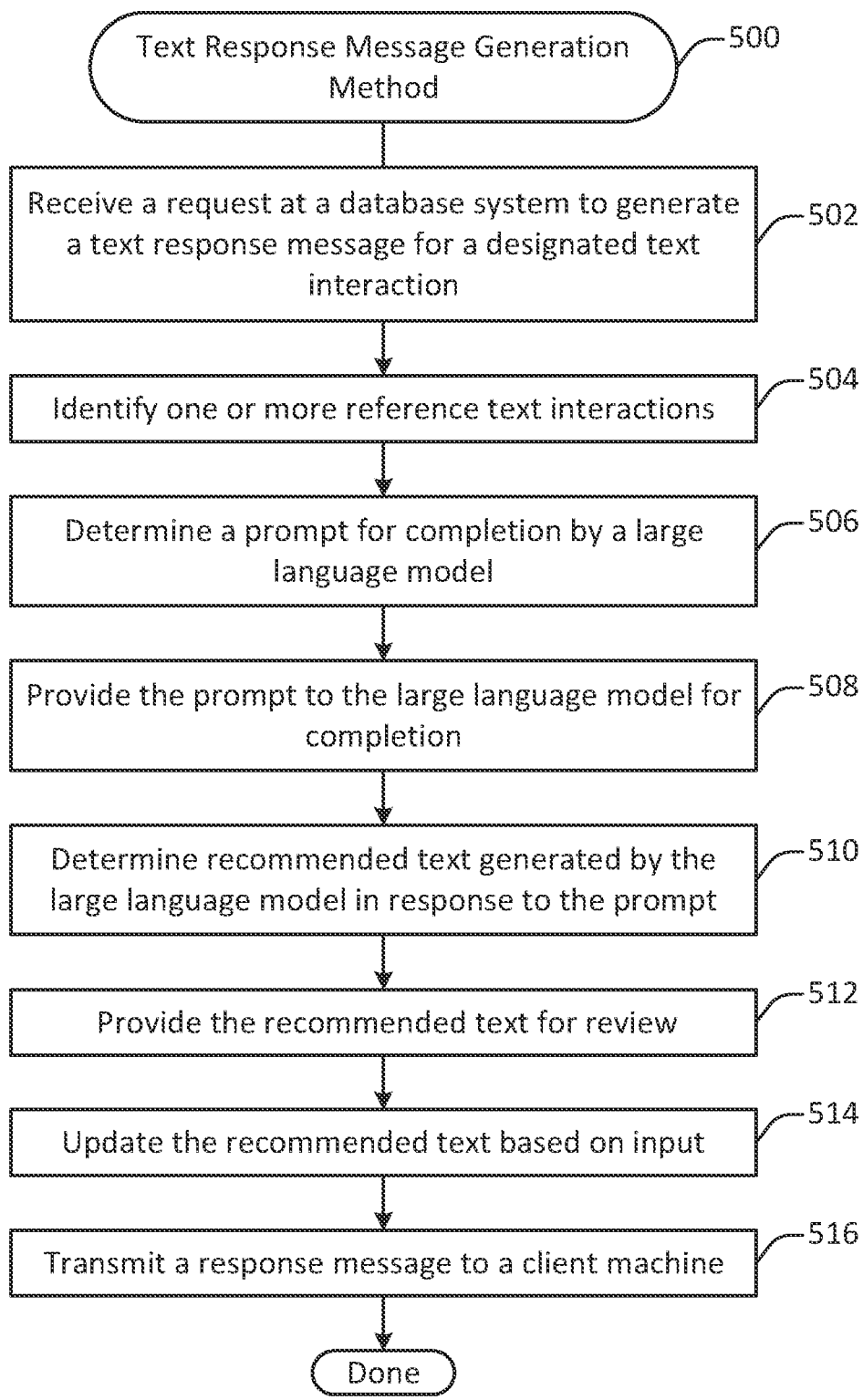
FIG. 5 illustrates a method for generating a text response message, performed in accordance with one or more embodiments.

In some embodiments, the determination as to whether to update one or more query criteria may be made based at least in part on user input. For instance, a user may indicate that recommended text generated as discussed with respect to FIG. 5 is not helpful. In such a situation, query criteria may be updated so as to identify different reference text interactions in a bid to increase the quality of recommended text generated by the system.

FIG. 5 illustrates a method 500 for generating a text response message, performed in accordance with one or more embodiments. In some embodiments, the method 500 may be performed by a database system, such as the database system 200 shown in FIG. 2.

At 502, a request is received at the database system to generate a text response message for a designated text interaction. In some embodiments, the request may be generated as discussed with respect to operation 108 shown in FIG. 1.

One or more reference text interactions are identified at 504. The one or more reference text interactions may be determined as discussed with respect to the method 400 shown in FIG. 4.

A prompt for completion by a large language model is determined at 508. In some embodiments, the prompt may be determined based on a prompt template. The prompt template may include one or more fillable portions that may be filled to create the prompt. For instance, the one or more fillable portions may be filled with some or all of the interaction text in the designated text interaction and with some or all of the interaction text in the reference text interactions. The prompt template and the prompt created based on the prompt template may include one or more natural language instructions to be executed by the large language model to generate the recommended text. An example of such a prompt template is as follows. In the following prompt template, the portion "{retrieved_past_conversations}" may be filled with text from one or more retrieved conversations determined in accordance with one or more embodiments, while the portion "{current_conversation_context}" may be filled with text from the current conversation.

> Assist the agent to respond to a customer in an ongoing customer service conversation provided below in CONVERSATION section. It must be for the agent to use in the next turn of the conversation. It must be concise and friendly. It must not repeat things the Agent has already said. The conversation context is provided below in the section CONVERSATION. If the customer's words may be considered unethical and inappropriate, you must not repeat the inappropriate words in the response.
>
> ###
> Respond using the following JSON format for the next agent response based on example similar conversations provided in SAMPLE PAST CONVERSATIONS section:
> Desired format:
>
> {{
>
> "past_conversation_relevant": < 0 or 1 >,
>
> "responses" : [
>
>   {{
>
>   "response" : < generated response >,
>
>   "intent":"<short response or none>",
>
>   "source" :
>
>     {{
>
>     "id": < id >,
>
>     "entity" : < entity >,
>
>     "snippet_starting_word_num" : "<start_word_number>",
>
>     "snippet_ending_word_num":"<end_word_number>"
>
>     }}
>
>   }}]
>
> }}
> ###
>
> INSTRUCTIONS
> Here are the instructions to follow to generate the output.
> 1. From the SAMPLE PAST CONVERSATIONS section, identify the most relevant conversation and extract "id" and "entity" corresponding to that conversation.
>   Set "past_conversation_relevant" to 1 in the output JSON if the conversation is relevant to the customer issue.

Set "past_conversation_relevant" to 0 if none of the provided conversations are relevant.
2. If "past_conversation_relevant" is 0, follow these instructions to generate the output JSON:
   Strictly, set "response" to "none" and "intent" to "none"
   Also, within "source" JSON for response, set "id" to "none", "entity" to "none", "snippet_starting_word_num" to −1 and set "snippet_ending_word_num" to −1.
3. If "past_conversation_relevant" is 1, follow these instructions to generate the output JSON:
   compare the current conversation to the identified relevant conversation in step 1 and identify a section where these two conversations are similar.
   generate a "short response" based on the identified section above for the agent to use in next turn. It must be 2-3 sentences from that section based on how the agent handled that scenario.
   Also, within "source" JSON for response, set "id" to extracted "id" (from step 1), "entity" to extracted "entity" (from step 1), "snippet_starting_word_num" to start_word_number (from step 3) and set "snippet_ending_word_num" to end_word_number (from step 3).
   Set "intent" in the output JSON to "short response"

SAMPLE PAST CONVERSATIONS
These are examples of past conversations that are similar to the current conversation: {retrieved_past_conversations}

CONVERSATION:
{current_conversation_context}

Response JSON:

In some embodiments, the prompt template may include one or more natural language instructions for generating a recommended text reply message appropriate to the context. For instance, the one or more natural language instructions may instruct the large language model to generate a text reply message responding to the interaction text in the designated text interaction, using as examples the reference interaction text included in the reference interactions.

The prompt is provided to the large language model at 508. In some embodiments, the prompt may be provided to the large language model via the large language model interface 210 shown in FIG. 2. The large language model may then generate recommended text by completing the prompt.

Recommended text generated by the large language model is determined at 510. In some embodiments, determining the recommended text may involve parsing a response message provided by the large language model to extract the novel text from the completed prompt.

The recommended text is provided for review at 512. In some embodiments, the recommended text may be provided via a graphical user interface such as an application provided to a human agent via a web browser. Alternatively, or additionally, the recommended text may be routed to a human agent operating through a remote system, for instance via an application procedure interface.

The recommended text is optionally updated based on input at 514. In some embodiments, the input may be provided by a human agent participating in the designated text interaction. For instance, the human agent may provide user input indicating one or more changes, insertions, and/or deletions that alter or supplement the recommended text.

A response message is sent to the client machine at 516. According to various embodiments, the response message may be sent via an interface suitable to the text interaction. For example, in the live chat context, the response message may be a live chat message. As another example, in the voice context, the response message may be a voice message determined by converting to voice the updated recommended text. As yet another example, in the asynchronous communication context, the response message may be an email or social media message.

Figure 6:
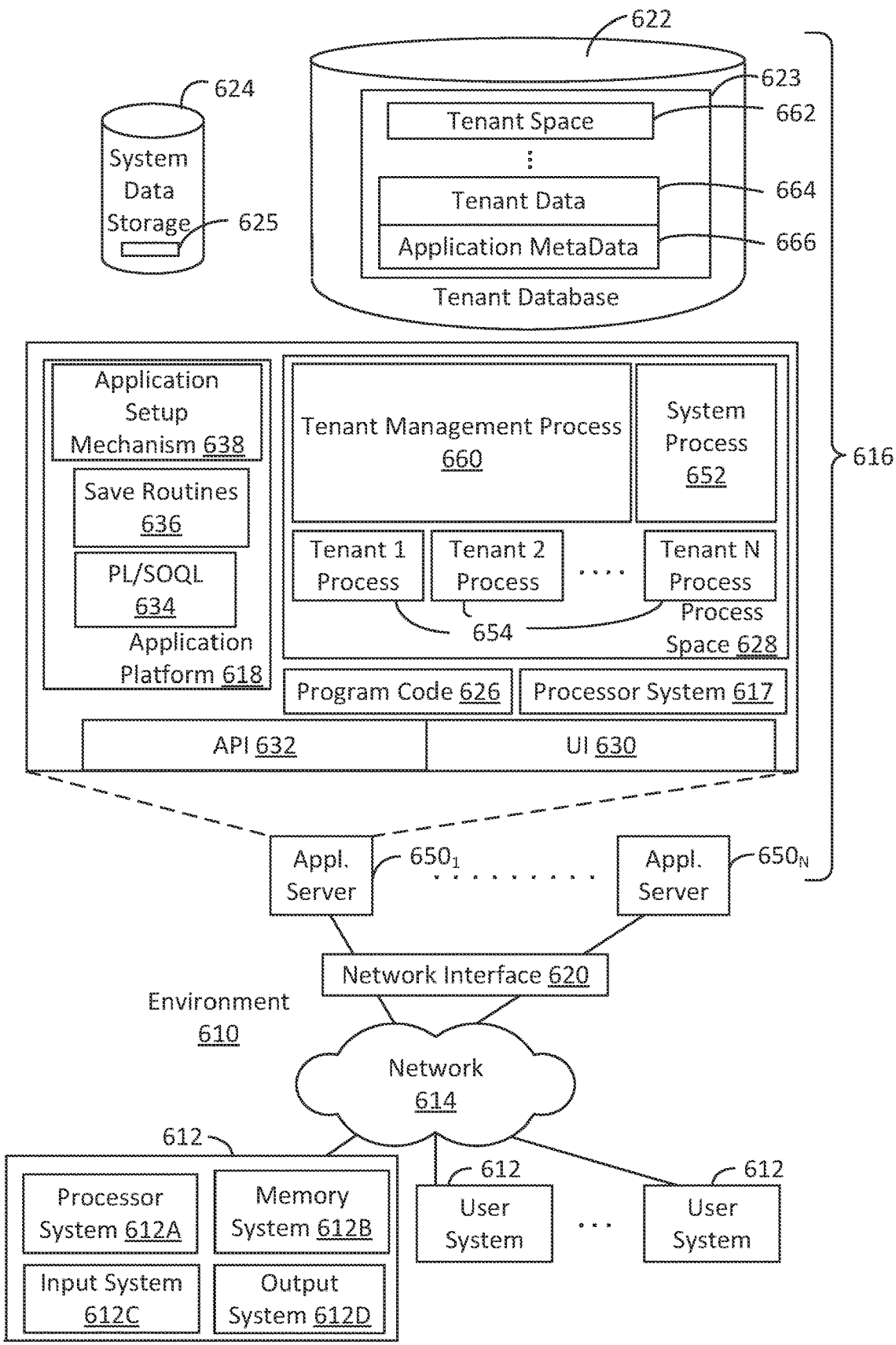
FIG. 6 shows a block diagram of an example of an environment that includes an on-demand database service configured in accordance with some implementations.

FIG. 6 shows a block diagram of an example of an environment 610 that includes an on-demand database service configured in accordance with some implementations. Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based text retrieval and generation system. For example, in some implementations, system 616 may include application servers configured to implement and execute text retrieval and generation software applications. The application servers may be configured to provide related data, code, forms, web pages and other information to and from user systems 612. Additionally, the application servers may be configured to store information to, and retrieve information from a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as a text retrieval and generation system, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For text retrieval and generation applications, such standard entities may include interaction records representing conversations and indexed based on information such as conversation topic and conversation embeddings. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 7A:
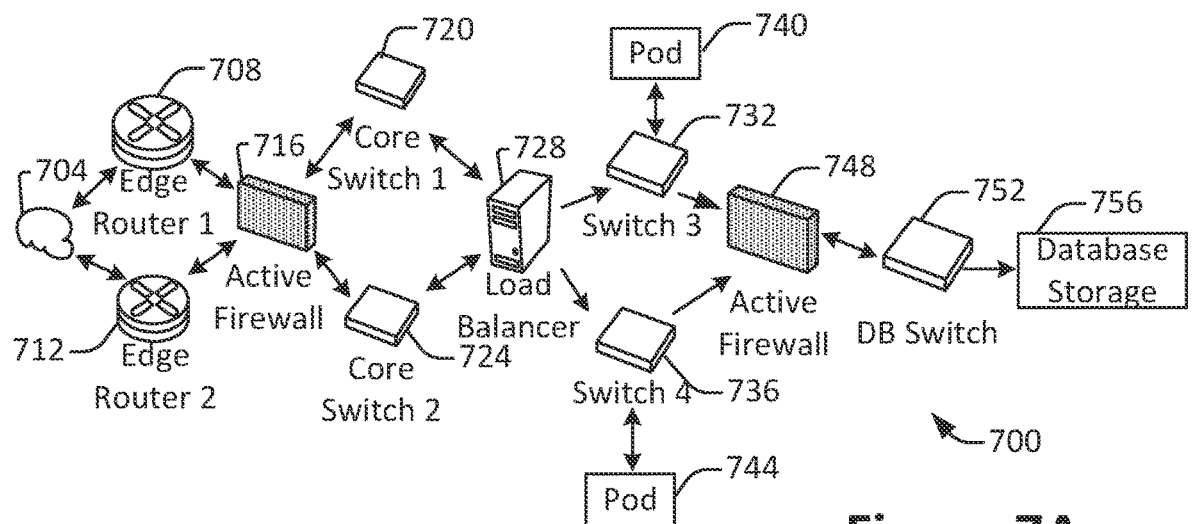
FIG. 7A shows a system diagram of an example of architectural components of an on-demand database service environment, configured in accordance with some implementations.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one-to-many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process text retrieval and generation information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

Figure 7B:
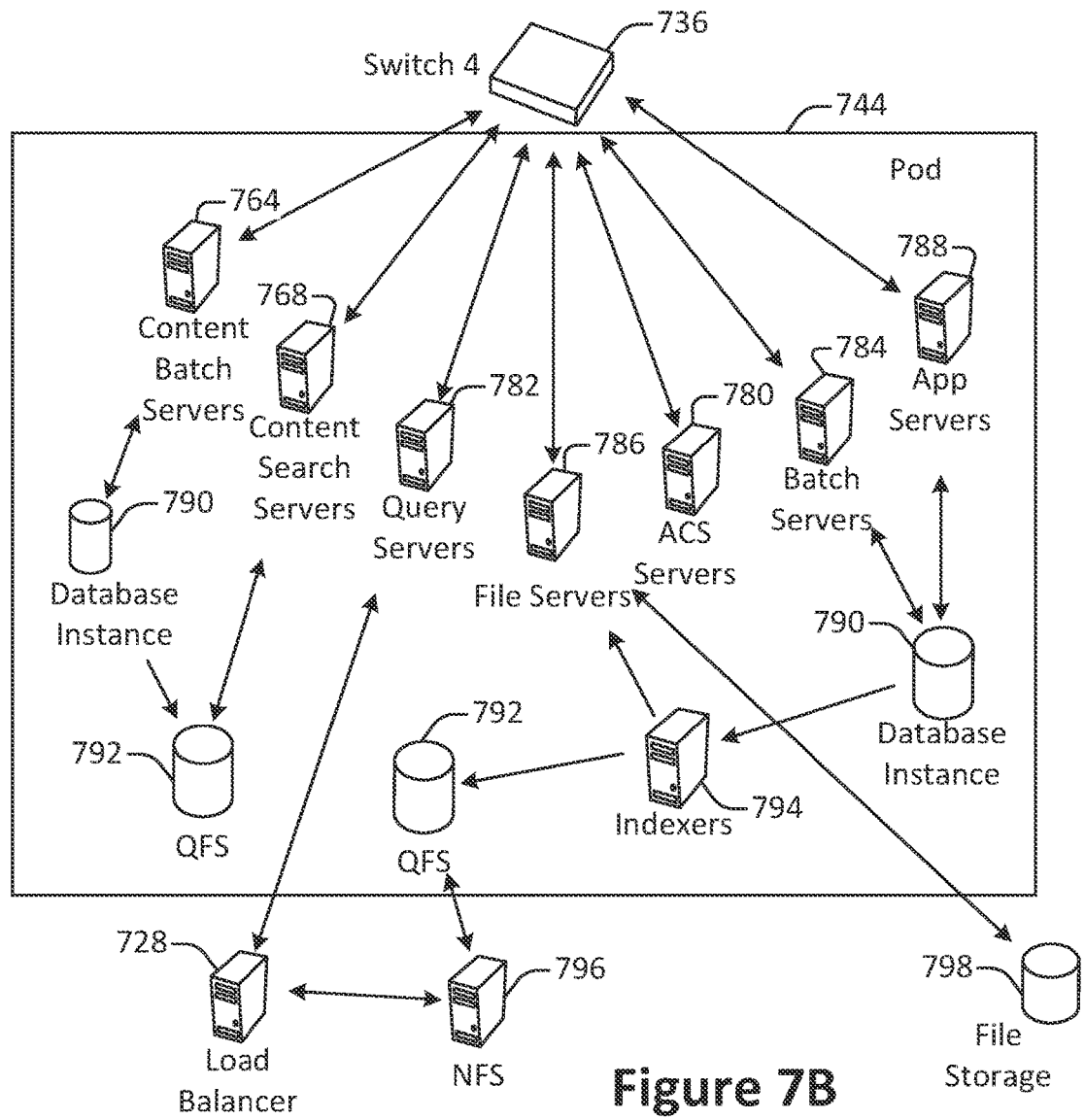
FIG. 7B shows a system diagram further illustrating an example of architectural components of an on-demand database service environment, in accordance with some implementations.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2° by IBM and the like without departing from the scope of present disclosure.

Figure 8:
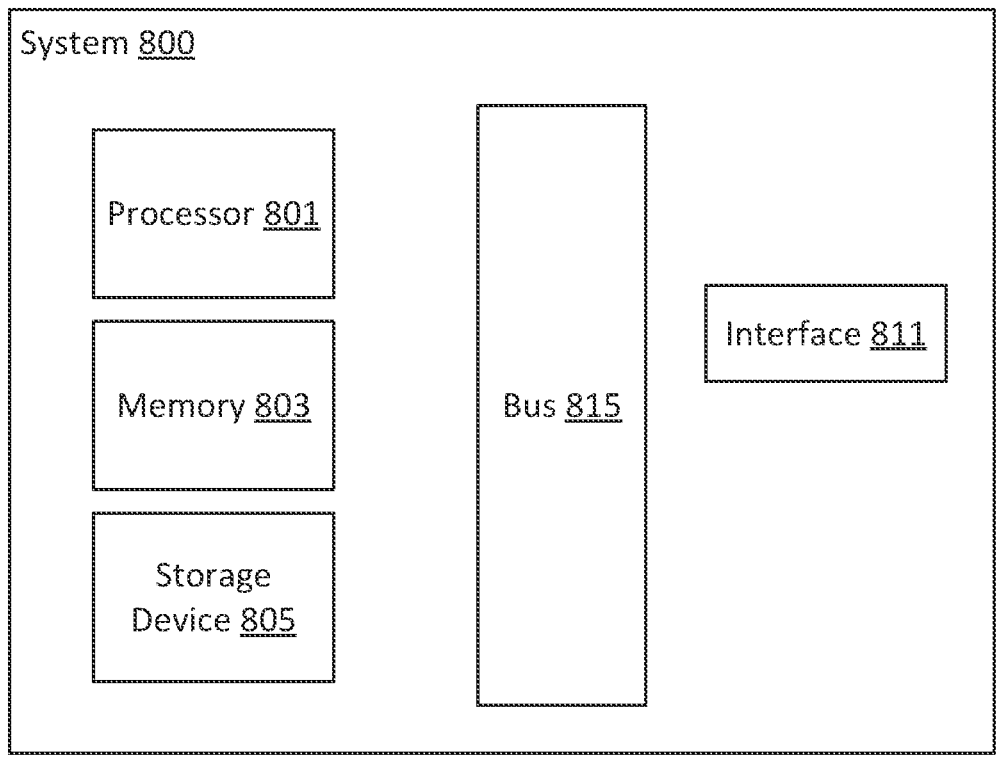
FIG. 8 illustrates one example of a computing device, configured in accordance with one or more embodiments.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of live chat interfaces. However, the techniques disclosed herein apply to a wide variety of interaction contexts, such as email-based interactions, text-message-based interactions, voice-based interactions, and the like. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
receiving a text interaction record at a database system, the text interaction record including interaction text from one or more messages between a client machine and a service provider;
determining a search vector based on the interaction text via a processor at the database system, the search vector including a text embedding representing the interaction text in a multi-dimensional vector space;
retrieving a reference interaction record from the database system based on the search vector, the reference interaction record including reference interaction text, the reference interaction record including a reference vector representing the reference interaction text in the multi-dimensional vector space;
determining recommended reply text based on the interaction text and the reference interaction text, the recommended reply text being determined by a large language model configured to generate the recommended reply text in response to a prompt that includes one or more natural language instructions; and
transmitting a response message from the database system to the client machine, the response message including some or all of the recommended reply text.

2. The method recited in claim 1, the method further comprising:
determining a text interaction topic based on the interaction text, wherein the search vector also includes the text interaction topic.

3. The method recited in claim 2, wherein the text interaction topic is determined by applying the large language model to some or all of the interaction text.

4. The method recited in claim 2, wherein the text interaction topic is determined by applying a topic model to some or all of the interaction text, the topic model being trained using a plurality of training data interaction records including the reference interaction record.

5. The method recited in claim 2, wherein the reference interaction record includes a database index that includes the reference vector and a reference interaction topic determined based on the reference interaction text.

6. The method recited in claim 1, wherein the text interaction record includes one or more metadata elements, and wherein the reference interaction record is determined based at least in part on the one or more metadata elements.

7. The method recited in claim 6, wherein the reference interaction text includes one or more reference messages between a reference client machine and a reference service provider, and wherein the one or more metadata elements includes an identity of a participant in the one or more reference messages.

8. The method recited in claim 6, wherein the reference interaction text includes one or more reference messages between a reference client machine and a reference service provider, and wherein the one or more metadata elements includes timing information identifying when the one or more reference messages were transmitted.

9. The method recited in claim 1, wherein the text embedding is determined via a text embedding model trained using a plurality of training data interactions including the reference interaction record.

10. The method recited in claim 1, wherein the one or more messages are text-based messages transmitted in a live chat session.

11. The method recited in claim 1, wherein the one or more messages are voice-based messages, and wherein the interaction text is determined by converting the one or more messages to text.

12. A database system comprising at least one processor and configured to perform a method, the method comprising:
    receiving a text interaction record, the text interaction record including interaction text from one or more messages between a client machine and a service provider;
    determining a search vector based on the interaction text via a processor at the database system, the search vector including a text embedding representing the interaction text in a multi-dimensional vector space;
    retrieving a reference interaction record from the database system based on the search vector, the reference interaction record including reference interaction text, the reference interaction record including a reference vector representing the reference interaction text in the multi-dimensional vector space;
    determining recommended reply text based on the interaction text and the reference interaction text, the recommended reply text being determined by a large language model configured to generate the recommended reply text in response to a prompt that includes one or more natural language instructions; and
    transmitting a response message to the client machine, the response message including some or all of the recommended reply text.

13. The database system recited in claim 12, wherein the text interaction topic is determined based on the interaction text, and wherein the search vector also includes the text interaction topic.

14. The database system recited in claim 13, wherein the text interaction topic is determined by applying the large language model to some or all of the interaction text.

15. The database system recited in claim 13, wherein the reference interaction record includes a database index that includes the reference vector and a reference interaction topic determined based on the reference interaction text.

16. The database system recited in claim 12, wherein the text interaction record includes one or more metadata elements, and wherein the reference interaction record is determined based at least in part on the one or more metadata elements.

17. The database system recited in claim 12, wherein the text embedding is determined via a text embedding model trained using a plurality of training data interactions including the reference interaction record.

18. One or more non-transitory computer readable media having instructions stored thereon for performing a method, the method comprising:
    receiving a text interaction record at a database system, the text interaction record including interaction text from one or more messages between a client machine and a service provider;
    determining a search vector based on the interaction text via a processor at the database system, the search vector including a text embedding representing the interaction text in a multi-dimensional vector space;
    retrieving a reference interaction record from the database system based on the search vector, the reference interaction record including reference interaction text, the reference interaction record including a reference vector representing the reference interaction text in the multi-dimensional vector space;
    determining recommended reply text based on the interaction text and the reference interaction text, the recommended reply text being determined by a large language model configured to generate the recommended reply text in response to a prompt that includes one or more natural language instructions; and
    transmitting a response message from the database system to the client machine, the response message including some or all of the recommended reply text.

19. The one or more non-transitory computer readable media recited in claim 18, the method further comprising:
    determining a text interaction topic based on the interaction text, wherein the search vector also includes the text interaction topic, wherein the reference interaction record includes a database index that includes the reference vector and a reference interaction topic determined based on the reference interaction text.

20. The one or more non-transitory computer readable media recited in claim 18, wherein the text interaction record includes one or more metadata elements, and wherein the reference interaction record is determined based at least in part on the one or more metadata elements, wherein the reference interaction text includes one or more reference messages between a reference client machine and a reference service provider, and wherein the one or more metadata elements includes an identity of a participant in the one or more reference messages.

* * * * *